Figure 1:
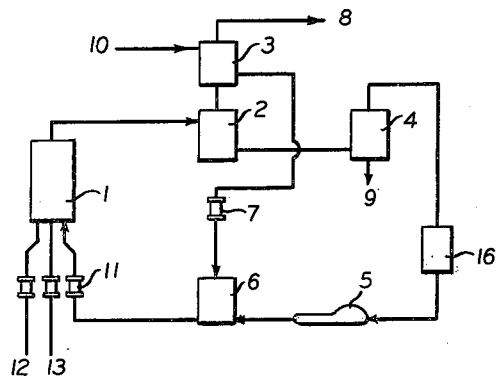

Oct. 24, 1961 EIJI OTSUKA 3,005,849
UREA SYNTHESIS USING EXCESS AMMONIA
Filed June 17, 1958

INVENTOR
EIJI OTSUKA
BY Mock & Blum
ATTORNEYS.

United States Patent Office 3,005,849
Patented Oct. 24, 1961

3,005,849
UREA SYNTHESIS USING EXCESS AMMONIA
Eiji Otsuka, Fujisawa City, Japan, assignor to Toyo Koatsu Industries, Incorporated, Tokyo, Japan, a corporation of Japan
Filed June 17, 1958, Ser. No. 742,689
15 Claims. (Cl. 260—555)

The invention relates to a process for manufacture of urea from ammonia and carbon dioxide under high temperatures and high pressures, and particularly to an improved process for manufacture of urea wherein ammonia and carbon dioxide in the proportion of 4–5 mols of ammonia to 1 mol of carbon dioxide are contacted at 180° C. and 280 atms., and also to an improved process of recovery and reutilization of the unreacted ammonia and carbon dioxide.

The invention has for its object to perform the urea synthesis using excess ammonia at such moderate conditions as a temperature of 180° C. and a pressure of 280 atms.

It has been known heretofore that urea synthesis can be performed using excess ammonia over the stoichiometrical amount, and also that the unreacted ammonia and carbon dioxide can be recovered and reutilized in the urea synthesis. However, as heretofore known, this procedure has the disadvantage that the synthesis must be performed at such high temperatures as 210–220° C. and at such high pressures as 400 atms., i.e., very severe conditions making the synthesis practically inoperable in view of industrial economy.

The urea synthesis must be performed with at least 70% conversion for industrial and economical manufacture of urea, and for such conversion the severe conditions mentioned above have been necessary because of the quantity of water which is returned to the urea synthesis with the recovered unreacted ammonia and carbon dioxide.

Now, it has been discovered that urea synthesis using excess ammonia may be realized with at least 70% conversion by the improved process of the invention.

According to the invention, the urea synthesis using excess ammonia is performed using 4–5 mols of ammonia and 1 mol of carbon dioxide at 180° C. and 280 atms., very moderate conditions of temperature and pressure.

The urea synthesis product, hereinafter called for convenience simply "urea melt," is withdrawn from the urea synthesis autoclave. The withdrawn urea melt at a high temperature, such as 180° C., and a high pressure, such as 280 atms., is conducted to a separator where it is reduced in pressure to 10–15 atms. and 90–120° C. whereby the major part of the excess ammonia used is vaporized and separated from the melt.

The separated excess ammonia is conducted to a condenser to be liquefied and to be returned to the urea synthesis.

However, it has been found that the separated excess ammonia contains a small amount of carbon dioxide such as 0.5% in volume, and that this small amount of carbon dioxide on liquefaction of the ammonia unites with a part of the latter, forming easily solid ammonium carbamate, which causes clogging of the piping system and other parts of the condenser, and therefore, makes the liquefaction practically inoperable.

According to the invention, prior to liquefaction, the separated excess ammonia is scrubbed with water to dissolve therein the small amount of carbon dioxide together with a corresponding amount of ammonia, thereby forming ammonium carbonate aqueous solution, which is set aside for reutilization.

By means of scrubbing with water, the separated excess ammonia is substantially made free of the small amount of carbon dioxide, and can thereafter be safely liquefied and recovered as liquid ammonia which can be returned to the urea synthesis for reuse.

The aqueous solution of ammonium carbonate set aside above, consists approximately of 50% ammonia, 20% carbon dioxide and 30% water. It is of course desirable to recover values of this solution for use in the urea synthesis.

It has been discovered that the aqueous solution of ammonium carbonate, if it is allowed to absorb ammonia and carbon dioxide at particular conditions of pressure and temperature, can be so condensed that it can be returned for reuse in the urea synthesis wherein conversion of 70% is obtained using excess ammonia and temperature of 180° C. and pressure of 280 atms.

The particular conditions are a temperature of 80–140° C. and a pressure of 20–50 atms. At these conditions, the aqueous solution of ammonium carbonate can absorb ammonia and carbon dioxide lowering the water content so that condensed aqueous ammonium carbonate liquid containing only 10–15% water can be obtained. This condensed aqueous ammonium carbonate liquid can be introduced into the reaction zone for the urea synthesis to enable the synthesis to be performed at such moderate conditions as a temperature of 180° C. and a pressure of 280 atms.

According to the invention, the ammonia and carbon dioxide for absorption by the aqueous solution of ammonium carbonate may be obtained by the following means.

The urea melt freed of the major part of the excess ammonia as described above and at 10–15 atms. pressure, can be treated in a still wherein distillation is effected at 1–3 atms., and there is obtained a gaseous mixture of ammonia and carbon dioxide and water vapor. This gaseous mixture can be dehumidified and compressed to 20–50 atms., and heated or cooled to the absorption temperature of 80–140° C., and can then be contacted with the aqueous ammonium carbonate solution.

Alternatively, urea melt made free of the major part of the excess ammonia as described above, and at 10–15 atms., can be compressed up to 20–50 atms., distilled to obtain a first gaseous mixture of ammonia and carbon dioxide, which can be directly passed to the absorber to be contacted with the aqueous solution of ammonium carbonate; and the urea melt from which the first gaseous mixture of ammonia and carbon dioxide has been distilled off can thereafter be distilled at 1–3 atms., so as to obtain a second gaseous mixture of ammonia and carbon dioxide and water vapor. This second gaseous mixture can be dehumidified and compressed to 20–50 atms. and then passed to the absorber to be contacted with the aqueous solution of ammonium carbonate.

The gaseous mixture of ammonia and carbon dioxide liberated by distillation at 1–3 atms., as mentioned above, must be subjected to dehumidification, or moisture-removal treatment.

The gaseous mixture of ammonia and carbon dioxide is, in the sense of the invention, passed into an aqueous ammonium carbonate solution maintained at temperatures and pressures such that solidification of ammonium carbonate due to combination of ammonia and carbon dioxide in the mixture does not occur. Water vapor of the gaseous mixture transfers to the aqueous ammonium carbonate solution and the gaseous mixture, after passing through the solution, contains only 7–10% of water vapor. In the transfer of the water vapor, some of the ammonia and carbon dioxide is transferred to the solution and the solution is increased in volume by the transfer of material. The increment of volume increase is continuously withdrawn and subjected to rectification for recovery of ammonia and carbon dioxide, discarding the remnant water.

There is a relation between the temperature and pressure at which the gaseous mixture is passed through the aqueous ammonium carbonate solution. For example, in case of 2 atms. the temperature is 65–70° C. and at 3 and 4 atms. the temperature is 72–75° C. and 78–75° C., respectively. Generally, the pressure is higher the higher the temperature, and vice versa.

The dehumidified, or moisture-deprived gaseous mixture is then compressed up to 20–50 atms. for the absorption. The compression can be effected easily and safely and without corrosion by a small compressor.

The excess ammonia recovered in accordance with the invention as liquefied ammonia containing a trace of carbon dioxide can be returned safely to the urea synthesis. Simultaneously, the aqueous ammonium carbonate formed in the scrubbing of the excess ammonia with water is, as mentioned above, worked into a condensed ammonium carbonate liquid containing only about 10–15% water, which can be returned to the urea synthesis which is carried out at 180° C. and a pressure of 280 atms. The gaseous mixture of ammonia and carbon dioxide which is absorbed by the aqueous ammonium carbonate solution is, in accordance with the invention, obtained by distilling the urea melt which has been treated for removal of the major part of the excess ammonia. By the distillation, the urea melt is substantially freed of the unreacted ammonia and carbon dioxide, contributing to a substantially complete recovery of the unreacted ammonia and carbon dioxide.

The recovery attainable by the invention is performed to reach about 100%, while the urea synthesis using excess ammonia is carried out at a very moderate condition of temperature (180° C.) and of pressure (280 atms.). Thus, the invention provides improvement over the known processes, wherein the urea synthesis using excess ammonia and recycling ammonia and carbon dioxide, has never been attainable at the moderate conditions of the invention.

The invention is now explained with reference to the accompanying drawings FIGS. 1 and 2, which illustrate diagrammatically the systems in which the invention can be carried out.

Figure 2:
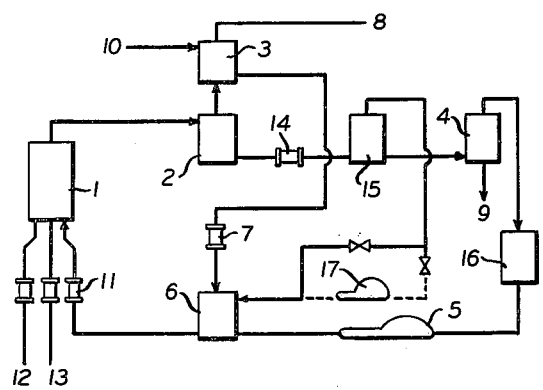
Figure 3:
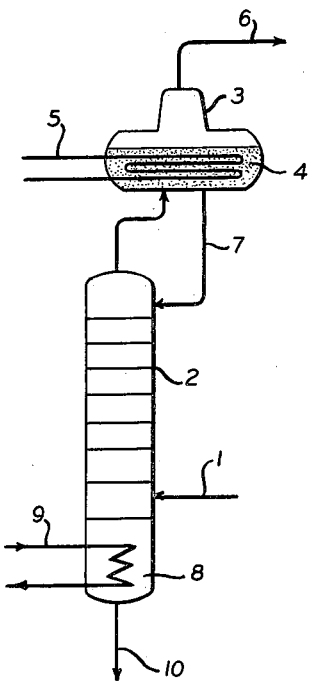

FIG. 1 is a diagrammatic view of one of the systems, and FIG. 2 is a similar view of a second system, which is slightly modified. FIG. 3 diagrammatically illustrates the dehumidification system.

Now, with reference to FIG. 1, the urea melt withdrawn from the urea synthesis autoclave 1 is conducted to a separator 2, wherein the melt is reduced in pressure to 10–15 atms., distilling off the major part of the excess ammonia. The separated excess ammonia is conducted to a scrubber 3, and washed with water, removing the small amount of carbon dioxide therefrom as an aqueous solution of ammonium carbonate.

The aqueous solution of ammonium carbonate is now passed to a plunger pump 7.

The excess ammonium separated and thus made free of the carbon dioxide is passed at 8 to a cooling condenser (not shown), and liquefied therein by condensation for recovery as liquid ammonia, which is returned as shown to the urea synthesis autoclave 1.

The aqueous solution of ammonium carbonate is passed to the plunger pump 7 whereby it is pumped to 20–50 atms. and is conducted to a liquefier 6, into which a gaseous mixture of ammonia and carbon dioxide is, after passing through dehumidifier 16, blown to be absorbed by the aqueous solution of ammonium carbonate.

The gaseous mixture is obtained from the urea melt from separator 2. The urea melt is distilled in still 4 at a pressure of 0–2 atms. gauge to provide the gaseous mixture.

The gaseous mixture obtained is passed to a dehumidifier 16 for dehumidification, and then conducted to a compressor 5, wherein it is compressed to 20–50 atms. and is then passed through the liquefier 6 where it is contacted for absorption by the aqueous solution of ammonium carbonate contained therein.

The aqueous solution of ammonium carbonate from the absorber 6 contains 10–15% water.

The liquid from absorber 6 is conducted to a plunger pump 11 and pumped to 280 atms., the urea synthesis pressure, and is returned to the urea synthesis autoclave 1 for reutilization for synthesis of urea.

The references 12 and 13 indicate the supply pipes by which ammonia and carbon dioxide are respectively introduced into the urea synthesis autoclave 1.

By effecting the operation in the above way, the urea synthesis using excess ammonia may be safely and continuously performed at the conditions of 180° C. and 280 atms. despite the use of excess ammonia and returning and reutilizing the unreacted ammonia and carbon dioxide.

FIG. 2 is similar to FIG. 1, but in FIG. 2 the urea melt from the separator 2 in which the major part of the excess ammonia is removed, is conducted to the plunger pump 14 and is then conducted to still 15, whereby, due to the partial decomposition of ammonium carbonate, a first gaseous mixture is obtained.

The first gaseous mixture is at 20–50 atms., and can be directly passed to the liquefier 6 for absorption.

The urea melt from still 15 and from which the first gaseous mixture was removed, is conducted to a still 4 to be distilled therein at 0–2 atms. gauge to provide a reduced gaseous mixture similar to FIG. 2.

The reduced gaseous mixture is similar to FIG. 1 as to the dehumidifier 16, and then, after compression to 20–50 atms. conducted to the liquefier 6 for absorption.

The construction and operation of the dehumidifier is now explained with reference to FIG. 3.

The gaseous mixture 1 enters the rectification column 2 near its base, and after passing through the column, emerges from its top to be conducted to a condenser 3, which contains aqueous ammonium carbonate solution as a coolant 4, which is cooled down to a definite temperature at a certain pressure, where solidification of ammonium carbamate does not occur.

The gaseous mixture ascends bubbling through the coolant, and transfers water vapor to the coolant. The transfer of the water vapor from the gaseous mixture to the aqueous ammonium carbonate solution is the so-called dehumidification or water-vapor-removal in the sense of the invention. The gaseous mixture thus deprived of its water vapor leaves the condenser 3 via outlet pipe 6.

The coolant is increased in volume by the transfer of the water vapor. The increment is continuously conducted via a pipe 7 to the top of the column 2, where it is heated for rectification, producing a mixture of gaseous ammonia and carbon dioxide, which mingles with the entering gaseous mixture 1 and passes therewith through the condenser 3 and is there dehumidified or deprived of water vapor, as mentioned above. The water formed as the result of the rectification is discarded through the outlet pipe 10.

*Example 1*

163.5 parts ammonia inclusive of 105.8 parts of the recovered liquid ammonia and 74.2 parts carbon dioxide are, together with 75.5 parts of the recovered and recycled aqueous solution of ammonium carbonate condensed in accordance with the hereinafter described method, subjected to urea synthesis at a pressure of 280 atms. and a temperature of 180° C. In this instance the excess of ammonia was taken at 150%. The conversion efficiency to urea was 71%.

The urea melt obtained by the above synthesis is conducted to a separator and kept at 13 atms. and 120° C., thereby separating the excess ammonia, which is after scrubbing with water liquefied. By this treatment there is obtained 105.8 parts liquid ammonia and 19.7 parts of aqueous solution of ammonium carbonate containing 30.5% of water.

The urea melt thus freed from the major part of the excess ammonia is now conducted to a still where distillation is effected at 1 atm. gauge and 120° C. By this distillation, 95% of the unreacted ammonia and carbon dioxide remaining is distilled off as a gaseous mixture of ammonia and carbon dioxide. This gaseous mixture is passed through the dehumidifier to be dehumidified, and is then passed to a three-step-type gas compressor, where it is compressed to 28 atms.

The compressed gaseous mixture consists of 27.8 parts ammonia, 24.0 parts carbon dioxide and 4.0 parts water vapor. The discharge from the last step of the compressor is at a temperature of 184° C.

The aqueous solution of ammonium carbonate condensed by absorption of the gaseous mixture is raised in pressure from 13 atms. to 28 atms. by means of a plunger pump, and then conducted to an absorber, where it is passed countercurrently to the gaseous mixture compressed to 28 atms. 75.5 parts of condensed aqueous solution of ammonium carbonate are thereby obtained, and the solution contains 13.2% water.

This condensed aqueous solution can, as is described in the beginning of the example, be recycled to the urea synthesis using excess ammonia.

The urea melt from the still operated at 1 atm. gauge is conducted to a concentrating vessel and concentrated to obtain 91% urea solution as a product.

Dilute solutions of ammonium carbonate are obtained from the concentrating vessel and the dehumidifier, and these may be recycled to the scrubber employed to remove the small amount of carbon dioxide contaminating the major part of the excess ammonia separated from the urea melt.

It will be seen from the foregoing that the unreacted ammonia and carbon dioxide produced in the urea synthesis using excess ammonia can be substantially wholly recovered for reutilization.

*Example 2*

139.1 parts ammonia inclusive of 82.3 parts of recovered liquid ammonia, and 73.4 parts carbon dioxide are, together with 140 parts of the recycled aqueous solution of ammonium carbonate as hereinafter described, charged into a urea synthesis autoclave wherein urea synthesis is performed at 180° C. and 280 atms. A urea melt is obtained and the melt consists of 161.4 parts ammonia, 39.5 parts carbon dioxide, 100 parts urea and 51.4 parts water. In this synthesis the excess of ammonia was 150%, and the synthesis yield of urea was 65%.

The urea melt having a pressure of 280 atms. and a temperature of 180° C. was reduced in pressure to 11 atms. with a temperature of 100° C., distilling off the major part of the ammonia remaining unreacted, which is, after scrubbing with water, recovered by liquefaction as 82.3 parts liquid ammonia, simultaneously obtaining from the scrubbing 53.9 parts of aqueous solution of ammonium carbonate containing 25.8 parts water The urea melt made free of the major part of the unreacted excess ammonia is conducted to a pressure-raising plunger pump where it is raised in pressure from 11 atms. to 35 atms. and thence to a still where distillation is effected at 35 atms. and 130° C., separating 35% of the unreacted ammonia and carbon dioxide remaining in the urea melt as a first gaseous mixture of ammonia and carbon dioxide, which is directly conveyed to an absorber for absorption.

The urea melt made free of the first gaseous mixture is now distilled at 1.5 atms. gauge and at 120° C., separating 55% of the whole unreacted reactants as a second gaseous mixture, and this second gaseous mixture is dehumidified by passing through a dehumidifier. Following dehumidification the second gaseous mixture is compressed by a three-step gas compressor to 35 atms., and is then conveyed to the absorber. The discharge from the last step had a temperature of 197° C.

The aqueous solution of ammonium carbonate obtained as above mentioned is compressed by the pressure-raising pump from 11 atms. to 35 atms. and conveyed to the top of the absorber, and is made to flow countercurrent to the first and the second gaseous mixture of ammonia and carbon dioxide, absorbing the two gaseous mixtures and producing 140 parts of condensed liquid of ammonium carbonate consisting of 56.4% ammonia, 28.3% carbon dioxide and 15.3% water, which is returned to the urea synthesis at 180° C. and 280 atms.

The urea melt freed of the second gaseous mixture is taken out and concentrated in the usual way to yield a final urea product.

In this instance, the efficiencies of use of ammonia and carbon dioxide were respectively 96.1% and 97%.

While specific embodiments of the invention have been shown and described in detail to illustrate the application of the invention principles, it will be understood that the invention may be embodied otherwise without departing from such principles.

I claim:

1. In a solution recycle process for the synthesis of urea wherein carbon dioxide and excess ammonia are reacted in a reaction zone to form a urea melt, the steps comprising (a) subjecting urea melt withdrawn from said reaction zone to a temperature and pressure and for a time sufficient for separating therefrom a first gaseous mixture comprising $NH_3$ in excess and $CO_2$, (b) scrubbing said first gaseous mixture with water to provide respective substantially pure $NH_3$ and an aqueous ammonium carbonate solution, (c) recycling the substantially pure ammonia to the reaction zone for reuse therein and passing the aqueous ammonium carbonate solution to a mixing chamber, (d) subjecting urea melt having said first gaseous mixture separated therefrom to a temperature and pressure and for a time sufficient for separating therefrom a second gaseous mixture and which comprises $NH_3$, $CO_2$, and $H_2O$; (e) dehumidifying the said second gaseous mixture for reducing the $H_2O$ content thereof, (f) introducing the dehumidified second gaseous mixture into the ammonium carbonate solution in said mixing chamber for absorption thereby for producing an ammonium carbonate solution of low $H_2O$ content, and (g) passing the ammonium carbonate solution of low water content to the reaction zone.

2. A process as claimed in claim 1, wherein the dehumidification carried out in step (e) comprises rectification of the second gaseous mixture and washing the rectified gaseous mixture with aqueous ammonium carbonate solution at a temperature and pressure such that solidification of ammonium carbamate does not occur.

3. A process as claimed in claim 1, the pressure in step (d), wherein the second gaseous mixture is formed, being about 1–3 atms. and said dehumidification comprising rectification of the second gaseous mixture wherein the overhead from the rectification is washed with aqueous ammonium carbonate solution at a pressure of about 2–4 atms. and a temperature of about 65–78° C. to provide the dehumidified gaseous mixture, whereby dehumidification is effected without solidification of ammonium carbamate.

4. A process as claimed in claim 3, the pressure in step (a), wherein said first gaseous mixture is separated from urea melt withdrawn from the reaction zone, being substantially 10–15 atmospheres.

5. A process according to claim 4, wherein the absorption of step (f) is carried out at a pressure of 20–50 atmospheres.

6. In a solution recycle process for the synthesis of urea wherein carbon dioxide and excess ammonia are reacted in a reaction zone at a relatively high pressure to form a urea melt, the steps comprising, (a) subjecting urea melt withdrawn from said reaction zone to a temperature and pressure and for a time sufficient for separating therefrom a first gaseous mixture comprising $NH_3$ in excess and $CO_2$, (b) scrubbing said first gaseous mixture with water to provide respectively substantially pure $NH_3$ and an aqueous ammonium carbonate solution, (c) recycling the substantially pure ammonia to the reaction zone for reuse therein and providing the aqueous ammonium carbonate solution at a pressure of substantially 20–50 atmospheres and passing it to a mixing chamber, (d) subjecting urea melt having said first gaseous mixture separated therefrom to a temperature and pressure and for a time sufficient for separating therefrom a second gaseous mixture and which comprises $NH_3$, $CO_2$, and $H_2O$; (e) dehumidifying the said second gaseous mixture for reducing the $H_2O$ content thereof, (f) providing the dehumidified second gaseous mixture at substantially 20–50 atmospheres and introducing it into the ammonium carbonate solution in said mixing chamber for absorption thereby for producing an ammonium carbonate solution of low $H_2O$ content, and (g) passing the ammonium carbonate solution of low water content to the reaction zone.

7. A process as claimed in claim 6, the pressure in step (a), wherein said first gaseous mixture is separated from urea melt withdrawn from the reaction zone, being substantially 10–15 atmospheres, and the pressure in step (d), wherein said second gaseous mixture is separate from urea melt, being substantially 1–3 atmospheres.

8. In a solution recycle process for synthesis of urea wherein carbon dioxide and excess ammonia are reacted in a reaction zone to form a urea melt and urea melt withdrawn from the reaction zone is distilled to separate therefrom a gaseous mixture comprising ammonia and carbon dioxide, and the gaseous mixture is scrubbed to provide an aqueous solution of ammonium carbonate for recovery of excess ammonia for reuse in the reaction zone, the improvement which comprises conducting the aforementioned distillation at a relatively high pressure, further distilling urea melt at a relatively low pressure to separate therefrom a gaseous mixture comprising ammonia, carbon dioxide, and water vapor, dehumidifying the gaseous mixture obtained by distillation at a relatively low pressure and absorbing the resulting dehumidified gaseous mixture in said aqueous solution of ammonium carbonate, whereby to enrich said aqueous solution of ammonium carbonate in ammonia and thereby provide a condensed aqueous ammonium carbonate solution for reuse in the reaction zone.

9. A process as claimed in claim 8, wherein the distillation of urea melt at a relatively low pressure is carried out at the pressure of about 1–3 atmospheres, and said dehumidification comprises rectification of the gaseous mixture obtained at a relatively low pressure wherein the overhead from the rectification is washed with aqueous ammonium carbonate solution at a pressure of about 2–4 atmospheres and a temperature of about 65–78° C. to provide the dehumidified gaseous mixture.

10. In a solution recycle process for the synthesis of urea from carbon dioxide and excess ammonia wherein one mol of $CO_2$ and 4-5 mols of $NH_3$ are reacted in a reaction zone at temperatures of the order of 180° C. and pressures of the order of 280 atmospheres to form a urea melt and wherein unreacted $NH_3$ and $CO_2$ separated from the urea melt are recovered and re-utilized in the urea synthesis; the steps comprising (a) subjecting urea melt withdrawn from said reaction zone to a first reduced pressure for separating therefrom a first gaseous mixture comprising $NH_3$ in excess and $CO_2$, (b) scrubbing said first gaseous mixture with water to provide respective pure $NH_3$ and an aqueous ammonium carbonate solution, (c) liquefying the said pure $NH_3$ for delivering under pressure for reuse in the reaction zone and passing the aqueous ammonuim carbonate solution to a mixing chamber, (d) subjecting the urea melt from which the said first gaseous mixture has been separated to a second and further reduced pressure for separating therefrom a second gaseous mixture comprising $NH_3$ and $CO_2$ and $H_2O$ vapor, (e) dehumidifying the said second gaseous mixture for reducing the $H_2O$ content thereof, and (f) introducing the dehumidified second gaseous mixture into the ammonium carbonate solution in the mixing chamber for absorption thereby for producing an ammonium carbonate solution of low $H_2O$ content for delivery under pressure for use in the reaction zone.

11. A process as claimed in claim 10 wherein the dehumidification carried out in step (e) comprises rectification of the second gaseous mixture and washing the rectified gaseous mixture with aqueous ammonium carbonate solution at a temperature and pressure above the solidification point of ammonium carbamate.

12. A process as claimed in claim 10 wherein the ammonium carbonate solution formed in step (b) and the dehumidified gaseous mixture formed in step (e) are delivered into the mixing chamber under pressure of 20–50 atmospheres, the solution and gaseous mixture respectively passing countercurrent one to the other.

13. A process as claimed in claim 10 wherein the separation of said first gaseous mixture from the withdrawn urea melt in step (a) is carried out under pressure of 10–15 atmospheres at temperatures of 90° C.–120° C., the ammonium carbonate solution formed in step (b) consits of about 50% $NH_3$, 20% $CO_2$ and 30% $H_2O$, the separating of the second gaseous mixture formed in step (d) is carried out at 1–3 atmospheres pressure and temperatures of about 120° C. and the dehumidification of the second gaseous mixture in step (e) is carried out at 2–4 atmospheres pressure and at temperatures of 65° C.–78° C.

14. A process in accordance with claim 10 wherein the urea melt subsequent to separation of the first gaseous mixture therefor in step (a) and prior to the separation of the second gaseous mixture therefrom in step (d) is subjected to an intermediate gaseous mixture separating step at a pressure above the pressures of the separation steps (a) and (d) but below the pressure in the reaction zone.

15. A process in accordance with claim 14 wherein the pressure of said intermediate gaseous mixture separating step is substantially 20–50 atmospheres and the temperature is substantially 120° C.–160° C.

References Cited in the file of this patent

UNITED STATES PATENTS

| 2,116,881 | De Ropp | May 10, 1938 |
| 2,212,847 | Porter | Aug. 27, 1940 |
| 2,267,133 | Porter | Dec. 23, 1941 |
| 2,632,771 | White | Mar. 24, 1953 |
| 2,807,574 | Hirano et al. | Sept. 24, 1957 |

FOREIGN PATENTS

| 758,670 | Great Britain | Oct. 10, 1956 |

OTHER REFERENCES

Tonn: Chem. Engineering, pages 186-190 (October 1955).